INVENTOR.
FREDERICK L. THAYER

United States Patent Office 3,513,697
Patented May 26, 1970

3,513,697
HAND LOADERS MAXIMUM EXPLOSION
PRESSURE INDICATOR
Frederick L. Thayer, Roseburg, Oreg.
(3028 SW. Jay, Pendleton, Oreg. 97801)
Filed Aug. 1, 1967, Ser. No. 657,575
Int. Cl. G01l 5/14
U.S. Cl. 73—167                                          1 Claim

ABSTRACT OF THE DISCLOSURE

A device, used to measure the maximum pressure developed inside a cartridge when the cartridge is fired within the bore of a suitable firearm. The device includes a ring shaped disk made of metal and fitting into a recess formed in the base of the cartridge, the recess being concentric with the primer hole. The primer is reinserted into its original position prior to the cartridge being fired. The cartridge is then fired, causing the primer and the ring, which was seated around the primer body, to be deformed by forces generated by the exploding charge. The expansion of the ring is measured by a gauge, providing an indication of the approximate explosive pressure that developed in the particular cartridge being tested.

This invention relates to gauge indicating devices, and more particularly to a combination of units which will indicate in pounds per square inch the maximum explosive pressure developed by a cartridge when fired within a firearm.

It is therefore the main purpose of this invention to provide a hand loader maximum explosion pressure indicator which may be utilized in kit form and used to give a substantially accurate reading in pounds per square inch of explosive pressure developed by a reloaded cartridge.

Another object of this invention is to provide a hand loader explosion pressure indicator kit which will have a ring made of metal which will be of closely toleranced thickness and having an inner diametrical dimension which will accommodate all conventional primers, whereas, the outside diametrical dimension will be allowed to vary in order to measure pressures over a wide range.

Still another object of this invention is to provide a hand loader maximum explosion pressure indicator kit which will have a taper gauge of flat stock material being calibrated in thousandths of an inch, each calibration being equal to a given explosion pressure in pounds per square inch, the gauge being inserted into the bore of the ring after the cartridge is fired.

Yet another object of this invention is to provide a hand pressure indicator kit in which a flat cutter element is used for modifying the recess in the head of the shell casing.

Other objects of the present invention are to provide a hand loader explosion pressure indicator kit which is simple in design, inexpensive to manufacture, easy to use and rugged in construction and efficient in operation.

These and other objects will become more readily evident upon a study of the following specifications and the accompanying drawings wherein.

Figure 1:
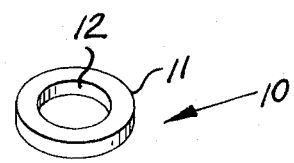
FIG. 1 is a perspective view of the ring portion of the present invention.

Referring to the drawing in detail, the reference numeral 10 represents a hand loader's maximum explosion pressure indicator kit which is provided with a ring 10 made of metal having an inside diameter 12 conforming to the outside diameter of conventional primers as used in pistol and rifle cartridges. The outside diameter 11 is variable, depending upon the cartridge. Ring 10 is received within a recess 13 to be provided in a shell casing 14, while the primer 15 is received on the interior of ring 10. A taper gauge of flat stock material 16 is provided with a plurality of calibrations 17, each measuring a difference in thousandths of an inch, and each graduation serving to indicate an explosive pressure registered in p.s.i.

In use, the cartridge containing ring 10 is placed into the firing chamber of the firearm and upon firing the cartridge the shell casing 14 is removed from the firing chamber. The taper gauge 16 is placed into ring 10 as far as it will go and the calibration 17 at that point will serve to determine the expansion of the inside diameter 12 of ring 10. Each of the calibrations 17 indicates a specific explosive pressure range, thus indicating the amount of pressure that particular cartridge exerted within the firing chamber of the firearm.

Figure 2:
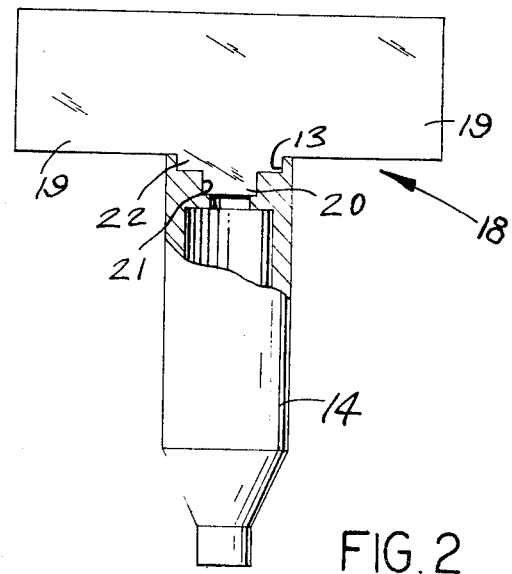
FIG. 2 is a side view of the cutter member shown inserted into a shell casing.
Figure 3:
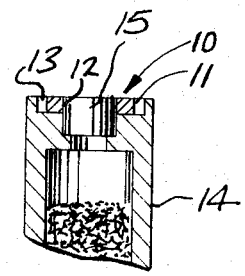
FIG. 3 is a fragmentary vertical view of a modified shell casing showing the ring and primer in position within the shell casing.
Figure 4:
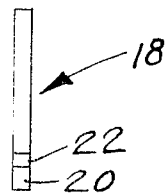
FIG. 4 is an end view of the cutter shown in FIG. 2.
Figure 5:
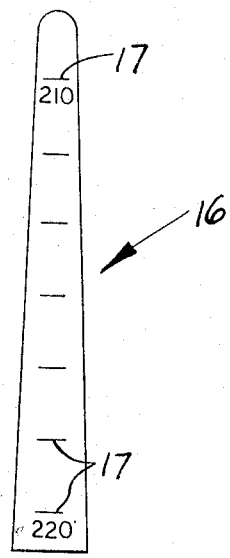
FIG. 5 is a plan view of the taper gauge used to determine the amount of force the cartridge developed when it was fired.

A convenient device for modifying a standard shell casing in accordance with the invention to conform with FIG. 3 above, is shown in FIGS. 2 and 4 above.

A cutter tool 18 is shown as applied to a shell casing having finger grip extensions 19 allowing it to be rotated. Cutter tool 18 is provided with a central guide extension 20 which fits down into the primer opening 21 of shell casing 14 and the cutting blades 22 providing means of countersinking recess 13 of shell casing 14.

It shall be noted that cutter tool 18 is used for modifying large rifle shell casings and is made of tool steel.

What I claim is:

1. A device for measuring the maximum explosion pressure developed in a cartridge when fired in the usual manner within a firearm; comprising in combination, (a) a cartridge provided with a recess in the base of said cartridge, said recess surrounding and being concentric with the hole into which the primer element of said cartridge is inserted;

(b) and an expansible metal ring of a size to fit in said recess, and to press fit the outside of a standard primer element with the inner diameter of the ring and having an outer radial dimension less than the radial width of sair recess so as to permit expansion of said metal ring, upon explosion of the shell, without engaging the outer wall of said recess, and said ring having a thickness equal to the depth of the recess;

(c) and whereby the difference between the original diameter and the expanded diameter of the ring upon firing the cartridge in the firearm, may be used to determine the maximum explosion pressure developed in said cartridge.

References Cited

UNITED STATES PATENTS

| | | | |
|---|---|---|---|
| 253,914 | 2/1882 | Dean | 73—35 |
| 2,212,547 | 8/1940 | Moseman | 73—35 |
| 2,445,307 | 7/1948 | Mindlin | 73—167 |
| 2,448,203 | 8/1948 | Africano | 73—35 |
| 2,935,945 | 5/1960 | Brady | 102—43 |
| 3,345,876 | 10/1967 | Smith | 73—388 |
| 3,443,430 | 5/1969 | York et al. | 73—167 |

RICHARD C. QUEISSER, Primary Examiner

M. SMOLLAR, Assistant Examiner

U.S. Cl. X.R.

73—35